(12) United States Patent
Balmer et al.

(10) Patent No.: US 6,745,319 B1
(45) Date of Patent: Jun. 1, 2004

(54) MICROPROCESSOR WITH INSTRUCTIONS FOR SHUFFLING AND DEALING DATA

(75) Inventors: Keith Balmer, Bedford (GB); David Hoyle, Glendale, AZ (US); Lewis Nardini, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 540 days.

(21) Appl. No.: 09/702,452

(22) Filed: Oct. 31, 2000

Related U.S. Application Data (60) Provisional application No. 60/183,527, filed on Feb. 18, 2000.

(51) Int. Cl.[7] ............... G06F 9/305; G06F 9/302; G06F 9/315; G06F 13/40
(52) U.S. Cl. ............. 712/223; 712/210; 712/212; 712/221; 712/300; 712/224; 712/35; 710/68; 708/212; 708/233; 708/625
(58) Field of Search ............ 341/80, 82; 710/68, 710/36; 712/300, 221, 222, 223, 224, 204, 23, 24, 212, 210, 35, 36; 708/625, 212, 233

(56) References Cited

U.S. PATENT DOCUMENTS

| 5,922,066 A | * | 7/1999 | Cho et al. ............ 712/204 |
| 6,112,289 A | * | 8/2000 | Matsuo ............... 712/23 |
| 6,370,559 B1 | * | 4/2002 | Hoffman ............. 708/625 |

* cited by examiner

*Primary Examiner*—Daniel H. Pan
(74) *Attorney, Agent, or Firm*—Robert D. Marshall, Jr.; W. James Brady, III; Frederick J. Telecky, Jr.

(57) ABSTRACT

A data processing system is provided with a digital signal processor (DSP) which has a shuffle instruction for shuffling a source operand (600) and storing the shuffled result in a selected destination register (610). A shuffled result is formed by interleaving bits from a first source operand portion with bits from a second operand portion. A de-interleave and pack (DEAL) instruction is provided for de-interleaving a source operand. The shuffle instruction and the DEAL instruction have an exactly inverse effect. The DSP includes swizzle circuitry that performs interleaving or de-interleaving in a single execution phase.

24 Claims, 8 Drawing Sheets

OPERATIONS ON THE .L UNIT

| 31 29 28 27 | 23 22 | 18 17 | 13 12 11 | 5 4 3 2 1 0 |
|---|---|---|---|---|
| CREG | Z | DST | SCR2 | SRC1/CST | X | OP | 1 1 0 | S | P |
| 3 | | 5 | 5 | 5 | | 7 | | | |

FIG. 3B

OPERATIONS ON THE .M UNIT

| 31 29 28 27 | 23 22 | 18 17 | 13 12 11 | 7 6 5 4 3 2 1 0 |
|---|---|---|---|---|
| CREG | Z | DST | SCR2 | SRC1/CST | X | OP | 0 0 0 0 | S | P |
| 3 | | 5 | 5 | 5 | | 5 | | | |

FIG. 3C

OPERATIONS ON THE .D UNIT

| 31 29 28 27 | 23 22 | 18 17 | 13 12 | 7 6 5 4 3 2 1 0 |
|---|---|---|---|---|
| CREG | Z | DST | SCR2 | SRC1/CST | OP | 1 0 0 0 | S | P |
| 3 | | 5 | 5 | 5 | 6 | | | |

FIG. 3D

LOAD/STORE WITH 15-BIT OFFSET (ON THE .D UNIT)

| 31 29 28 27 | 23 22 | 8 7 6 | 4 3 2 1 0 |
|---|---|---|---|
| CREG | Z | DST/SRC | UCST15 | Y | LD/ST | 1 1 | S | P |
| 3 | | 5 | 15 | | 3 | | | |

FIG. 3E

LOAD/STORE 'BASER' + 'OFFSETR/CST' ON THE .D UNIT

| 31 29 28 27 | 23 22 | 18 17 | 13 12 | 9 8 7 6 | 4 3 2 1 0 |
|---|---|---|---|---|---|
| CREG | Z | DST/SRC | BASE R | OFFSET R/UCST5 | MODE | R | Y | LD/ST | 0 1 | S | P |
| 3 | | 5 | 5 | 5 | 4 | | | 3 | | | |

OPERATIONS ON THE .S UNIT

| 31 29 | 28 27 | 23 22 | 18 17 | 13 12 11 | 6 5 4 3 2 | 1 | 0 |
|---|---|---|---|---|---|---|---|
| CREG | Z | DST | SRC2 | SRC1/CST | X | OP | 0 0 0 0 | S | P |
| 3 | | 5 | 5 | 5 | | 6 | | |

FIG. 3F

ADDK ON THE .S UNIT

| 31 29 | 28 27 | 23 22 | 7 6 5 4 3 2 | 1 | 0 |
|---|---|---|---|---|---|
| CREG | Z | DST | CST | 1 0 1 0 0 | S | P |
| 3 | | 5 | 16 | | | |

FIG. 3G

BITFIELD OPERATIONS (IMMEDIATE FORMS) ON THE .S UNIT

| 31 29 | 28 27 | 23 22 | 18 17 | 13 12 | 8 7 6 | 5 4 3 2 | 1 | 0 |
|---|---|---|---|---|---|---|---|---|
| CREG | Z | DST | SRC2 | CSTA | CSTB | OP | 0 0 1 0 | S | P |
| 3 | | 5 | 5 | 5 | | 2 | | |

FIG. 3H

MVK AND MVKH ON THE .S UNIT

| 31 29 | 28 27 | 23 22 | 7 6 | 5 4 3 2 | 1 | 0 |
|---|---|---|---|---|---|---|
| CREG | Z | DST | CST | H | 0 1 0 | S | P |
| 3 | | 5 | 16 | | | | |

FIG. 3I

BCOND DISP ON THE .S UNIT

| 31 29 | 28 27 | 7 6 5 4 3 2 | 1 | 0 |
|---|---|---|---|---|
| CREG | Z | CST | 0 0 1 0 0 | S | P |
| 3 | | 21 | | |

MICROPROCESSOR WITH INSTRUCTIONS FOR SHUFFLING AND DEALING DATA

This application claims priority under 35 USC §119 (e)(1) of Provisional Application No. 60/183,527, filed Feb. 18, 2000.

NOTICE (C) Copyright 2000 Texas Instruments Incorporated. A portion of the disclosure of this patent document contains material which is subject to copyright protection. The copyright owner has no objection to the facsimile reproduction by anyone of the patent disclosure, as it appears in the Patent and Trademark Office patent file or records, but otherwise reserves all copyright rights whatsoever.

TECHNICAL FIELD OF THE INVENTION

This invention relates to data processing devices, electronic processing and control systems and methods of their manufacture and operation, and particularly relates to microprocessors optimized for digital signal processing.

BACKGROUND OF THE INVENTION

Generally, a microprocessor is a circuit that combines the instruction-handling, arithmetic, and logical operations of a computer on a single semiconductor integrated circuit. Microprocessors can be grouped into two general classes, namely general-purpose microprocessors and special-purpose microprocessors. General-purpose microprocessors are designed to be programmable by the user to perform any of a wide range of tasks, and are therefore often used as the central processing unit (CPU) in equipment such as personal computers. Special-purpose microprocessors, in contrast, are designed to provide performance improvement for specific predetermined arithmetic and logical functions for which the user intends to use the microprocessor. By knowing the primary function of the microprocessor, the designer can structure the microprocessor architecture in such a manner that the performance of the specific function by the special-purpose microprocessor greatly exceeds the performance of the same function by a general-purpose microprocessor regardless of the program implemented by the user.

One such function that can be performed by a special-purpose microprocessor at a greatly improved rate is digital signal processing. Digital signal processing generally involves the representation, transmission, and manipulation of signals, using numerical techniques and a type of special-purpose microprocessor known as a digital signal processor (DSP). Digital signal processing typically requires the manipulation of large volumes of data, and a digital signal processor is optimized to efficiently perform the intensive computation and memory access operations associated with this data manipulation. For example, computations for performing Fast Fourier Transforms (FATS) and for implementing digital filters consist to a large degree of repetitive operations such as multiply-and-add and multiple-bit-shift. DSPs can be specifically adapted for these repetitive functions, and provide a substantial performance improvement over general-purpose microprocessors in, for example, real-time applications such as image and speech processing.

DSPs are central to the operation of many of today's electronic products, such as high-speed modems, high-density disk drives, digital cellular phones, complex automotive systems, and video-conferencing equipment. DSPs will enable a wide variety of other digital systems in the future, such as video-phones, network processing, natural speech interfaces, and ultra-high speed modems. The demands placed upon DSPs in these and other applications continue to grow as consumers seek increased performance from their digital products, and as the convergence of the communications, computer and consumer industries creates completely new digital products.

Microprocessor designers have increasingly endeavored to exploit parallelism to improve performance. One parallel architecture that has found application in some modern microprocessors utilizes multiple instruction fetch packets and multiple instruction execution packets with multiple functional units.

Digital systems designed on a single integrated circuit are referred to as an application specific integrated circuit (ASIC). MegaModules are being used in the design of ASICs to create complex digital systems a single chip. (MegaModule is a trademark of Texas Instruments Incorporated.) Types of MegaModules include SRAMs, FIFOs, register files, RAMs, ROMs, universal asynchronous receiver-transmitters (UARTs), programmable logic arrays and other such logic circuits. MegaModules are usually defined as integrated circuit modules of at least 500 gates in complexity and having a complex ASIC macro function. These MegaModules are predesigned and stored in an ASIC design library. The MegaModules can then be selected by a designer and placed within a certain area on a new IC chip.

Designers have succeeded in increasing the performance of DSPs, and microprocessors in general, by increasing clock speeds, by removing data processing bottlenecks in circuit architecture, by incorporating multiple execution units on a single processor circuit, and by developing optimizing compilers that schedule operations to be executed by the processor in an efficient manner. The increasing demands of technology and the marketplace make desirable even further structural and process improvements in processing devices, application systems and methods of operation and manufacture.

SUMMARY OF THE INVENTION

An illustrative embodiment of the present invention seeks to provide a microprocessor, and a method for operating a microprocessor that improves digital signal processing performance. Aspects of the invention are specified in the claims.

In an embodiment of the present invention, a data processing system is provided with a digital signal processor that has swizzle circuitry connected to receive a source operand and has destination operand outputs for providing a destination operand in response to control signals from instruction decode circuitry. The swizzle circuitry is operable to form an interleaved result on the destination operand outputs by interleaving bits from a first portion of the operand with bits from a second portion of the operand.

In an embodiment of the present invention, a data processing system is provided with a digital signal processor that has a shuffle (SHFL) instruction for shuffling a source operand and storing the shuffled result in a selected destination register. A shuffled result is formed by interleaving bits from a first source operand portion with bits from a second operand portion.

In another embodiment, a de-interleave and pack (DEAL) instruction is provided for de-interleaving a source operand by extracting a first set of bits from the source operand to form a first field and extracting a second set of bits from the source operand to form a second field and then packing the first field and the second field together to form a de-interleaved result.

In another embodiment, the SHFL instruction and the DEAL instruction have an exactly inverse effect.

BRIEF DESCRIPTION OF THE DRAWINGS

Other features and advantages of the present invention will become apparent by reference to the following detailed description when considered in conjunction with the accompanying drawings, in which.

DETAILED DESCRIPTION OF EMBODIMENTS OF THE INVENTION

Figure 1:
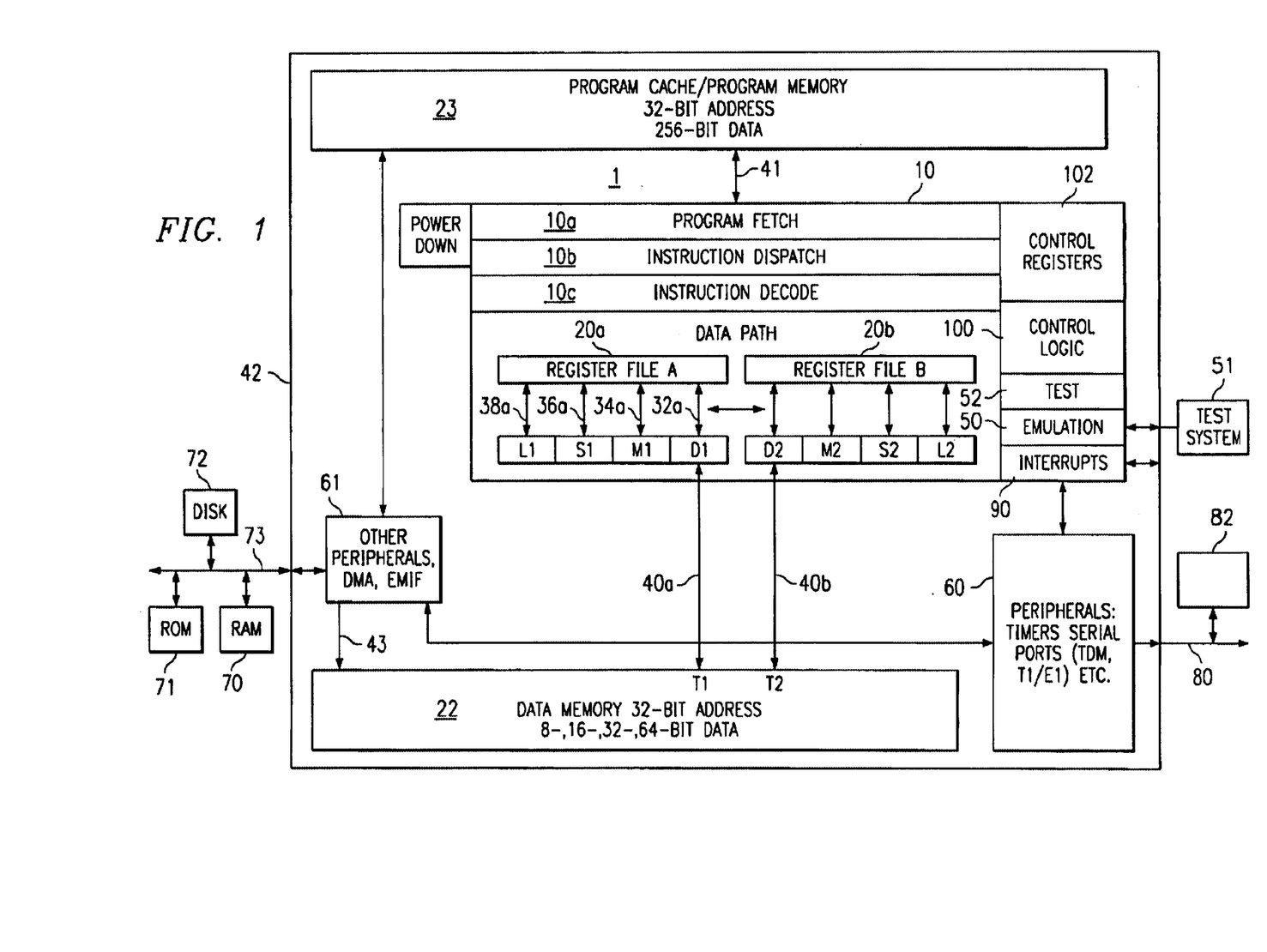
FIG. 1 is a block diagram of a digital signal processor (DSP), showing components thereof pertinent to an embodiment of the present invention.

FIG. 1 is a block diagram of a microprocessor 1 which has an embodiment of the present invention. Microprocessor 1 is a VLIW digital signal processor ("DSP"). In the interest of clarity, FIG. 1 only shows those portions of microprocessor 1 that are relevant to an understanding of an embodiment of the present invention. Details of general construction for DSPs are well known, and may be found readily elsewhere. For example, U.S. Pat. No. 5,072,418 issued to Frederick Boutaud, et al, describes a DSP in detail and is incorporated herein by reference. U.S. Pat. No. 5,329,471 issued to Gary Swoboda, et al, describes in detail how to test and emulate a DSP and is incorporated herein by reference. Details of portions of microprocessor 1 relevant to an embodiment of the present invention are explained in sufficient detail hereinbelow, so as to enable one of ordinary skill in the microprocessor art to make and use the invention.

In microprocessor 1 there are shown a central processing unit (CPU) 10, data memory 22, program memory 23, peripherals 60 and an external memory interface (EMIF) with a direct memory access (DMA) 61. CPU 10 further has an instruction fetch/decode unit 10a–c, a plurality of execution units, including an arithmetic and load/store unit D1, a multiplier M1, an ALU/shifter unit S1, an arithmetic logic unit ("ALU") L1, a shared multi-port register file 20a from which data are read and to which data are written. Instructions are fetched by fetch unit 10a from instruction memory 23 over a set of busses 41. Decoded instructions are provided from the instruction fetch/decode unit 10a–c to the functional units D1, M1, S1, and L1 over various sets of control lines which are not shown. Data are provided to/from the register file 20a from/to to load/store units D1 over a first set of busses 32a, to multiplier M1 over a second set of busses 34a, to ALU/shifter unit S1 over a third set of busses 36a and to ALU L1 over a fourth set of busses 38a. Data are provided to/from the memory 22 from/to the load/store units D1 via a fifth set of busses 40a. Note that the entire data path described above is duplicated with register file 20b and execution units D2, M2, S2, and L2. In this embodiment of the present invention, two unrelated aligned double word (64 bits) load/store transfers can be made in parallel between CPU 10 and data memory 22 on each clock cycle using bus set 40a and bus set 40b.

A single non-aligned double word load/store transfer is performed by scheduling a first .D unit resource and two load/store ports on memory 22. Advantageously, an extraction circuit is connected to the memory subsystem to provide a non-aligned data item extracted from two aligned data items requested by the .D unit. Advantageously, a second .D unit can perform 32-bit logical or arithmetic instructions in addition to the .S and .L units while the address port of the second .D unit is being used to transmit one of two contiguous addresses provided by the first .D unit. Furthermore, a non-aligned access near the end of a circular buffer region in the target memory provides a non-aligned data item that wraps around to the other end of the circular buffer Emulation circuitry 50 provides access to the internal operation of integrated circuit 1 that can be controlled by an external test/development system (XDS) 51. External test system 51 is representative of a variety of known test systems for debugging and emulating integrated circuits. One such system is described in U.S. Pat. No. 5,535,331 which is incorporated herein by reference. Test circuitry 52 contains control registers and parallel signature analysis circuitry for testing integrated circuit 1.

Note that the memory 22 and memory 23 are shown in FIG. 1 to be a part of a microprocessor 1 integrated circuit, the extent of which is represented by the box 42. The memories 22–23 could just as well be external to the microprocessor 1 integrated circuit 42, or part of it could reside on the integrated circuit 42 and part of it be external to the integrated circuit 42. These are matters of design choice. Also, the particular selection and number of execution units are a matter of design choice, and are not critical to the invention.

When microprocessor 1 is incorporated in a data processing system, additional memory or peripherals may be connected to microprocessor 1, as illustrated in FIG. 1. For example, Random Access Memory (RAM) 70, a Read Only Memory (ROM) 71 and a Disk 72 are shown connected via an external bus 73. Bus 73 is connected to the External Memory Interface (EMIF) which is part of functional block 61 within microprocessor 1. A Direct Memory Access (DMA) controller is also included within block 61. The DMA controller is generally used to move data between memory and peripherals within microprocessor 1 and memory and peripherals which are external to microprocessor 1.

In the present embodiment, CPU core 10 is encapsulated as a MegaModule, however, other embodiments of the present invention may be in custom designed CPU's or mass market microprocessors, for example.

A detailed description of various architectural features of the microprocessor of FIG. 1 is provided in coassigned U.S.

Pat. No. 6,182,813 entitled Microprocessor which is incorporated herein by reference. A description of enhanced architectural features and an extended instruction set not described herein for CPU 10 is provided in coassigned U.S. patent application Ser. No. 09/703,096 filed Oct. 31, 2000 entitled Microprocessor with Improved Instruction Set Architecture and is incorporated herein by reference.

Figure 2:
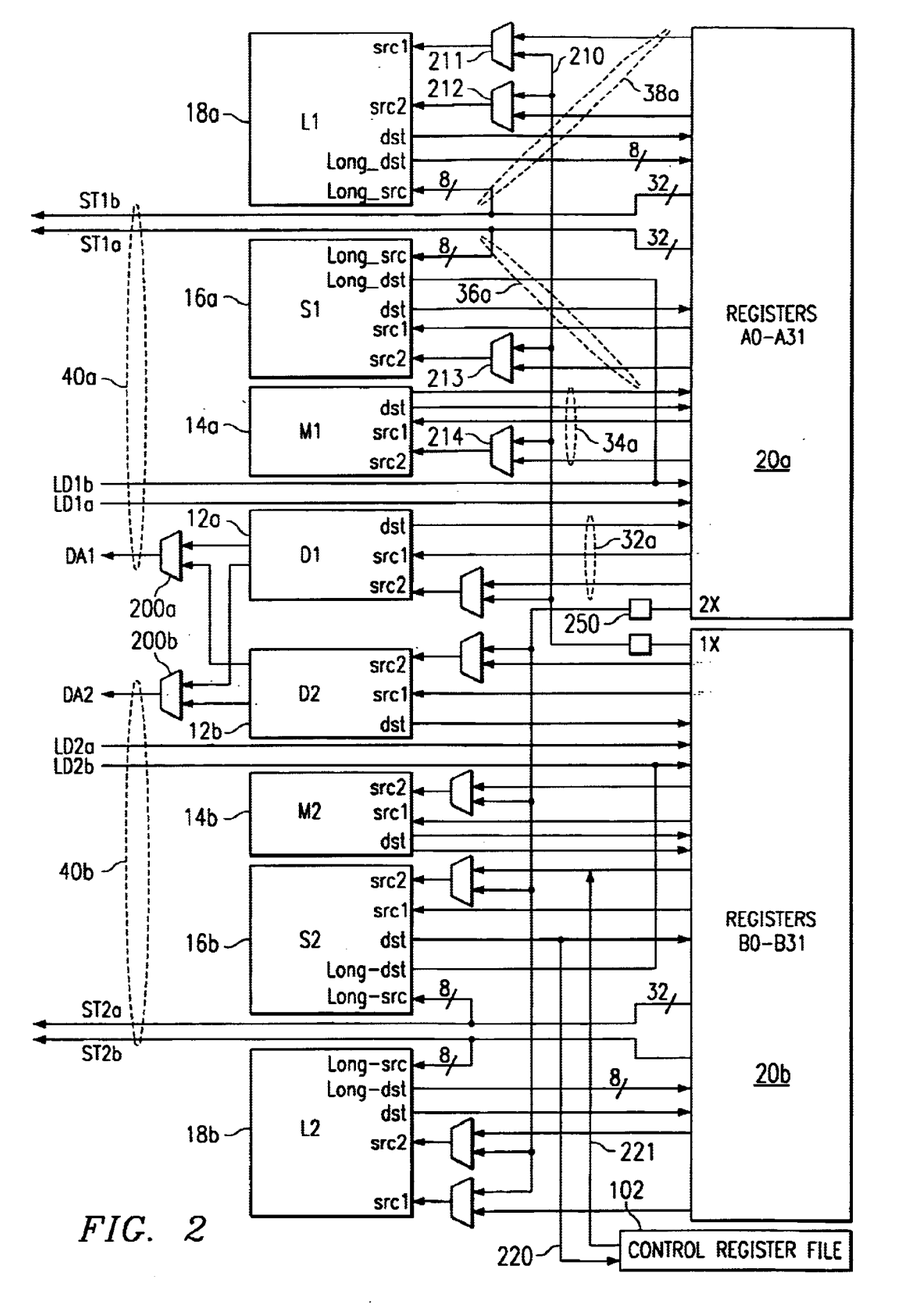
FIG. 2 is a block diagram of the functional units, data paths and register files of FIG. 1.
Figures 3A, 3B:
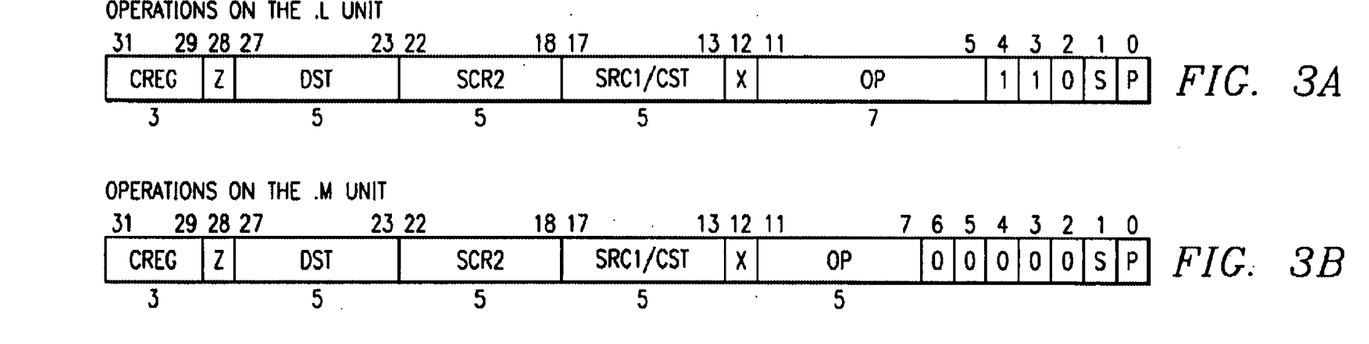
FIGS. 3A–3J show an opcode map for the DSP of FIG. 1.
Figure 3C:
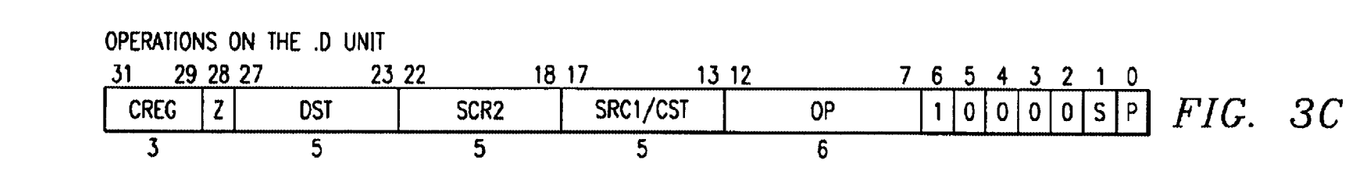
Figure 3D:
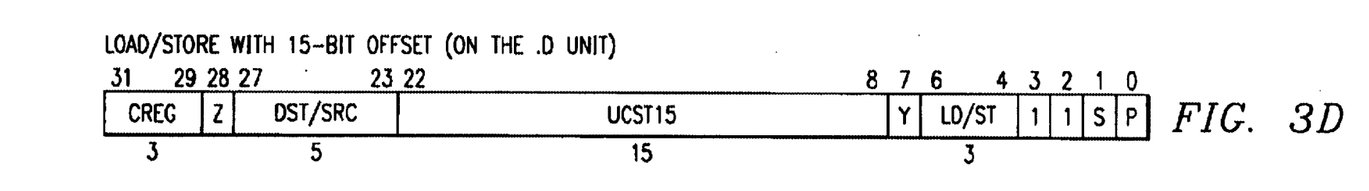
Figure 3E:
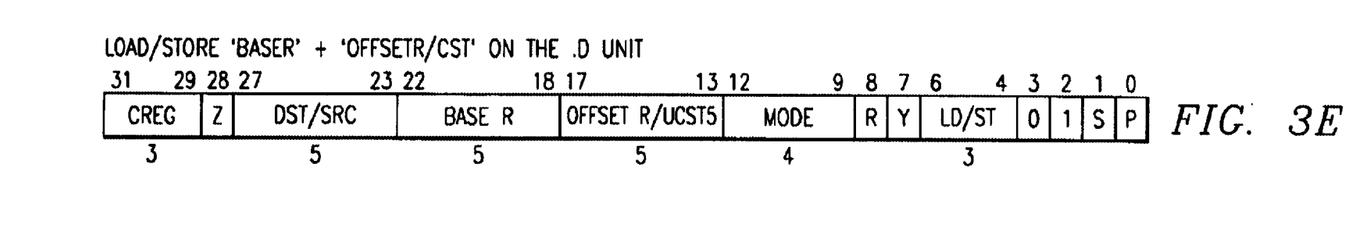
Figures 3F, 3G, 3H:
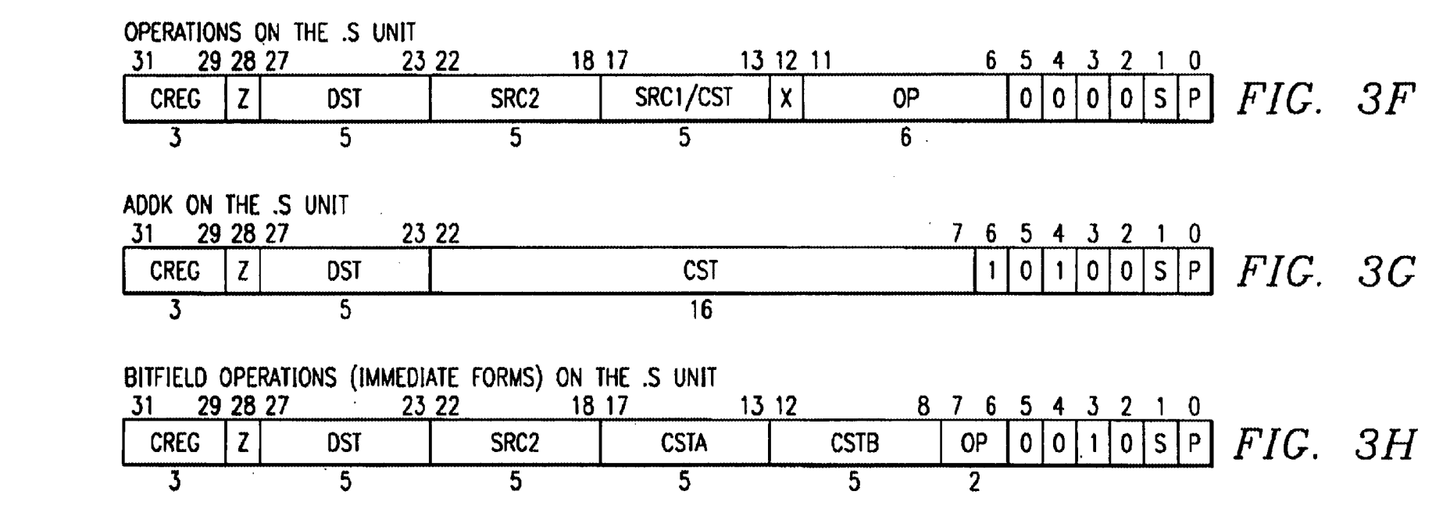
Figure 3I:
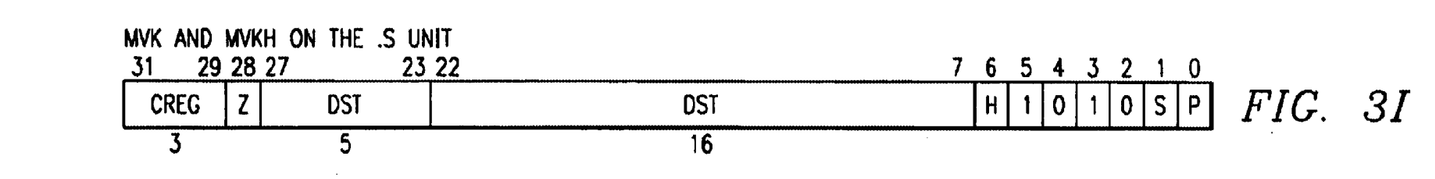
Figure 3J:
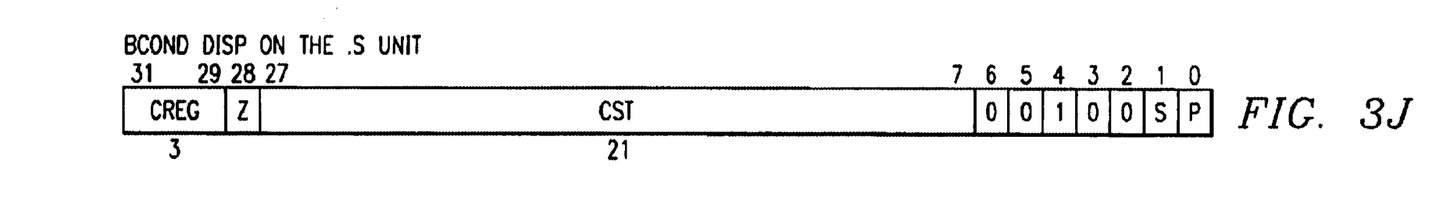

FIG. 2 is a block diagram of the execution units and register files of the microprocessor of FIG. 1 and shows a more detailed view of the buses connecting the various functional blocks. In this figure, all data busses are 32 bits wide, unless otherwise noted. There are two general-purpose register files (A and B) in the processor's data paths. Each of these files contains 32 32-bit registers (A0–A31 for file A 20a and B0–B31 for file B 20b). The general-purpose registers can be used for data, data address pointers, or condition registers. Any number of reads of a given register can be performed in a given cycle.

The general-purpose register files support data ranging in size from packed 8-bit data through 64-bit fixed-point data. Values larger than 32 bits, such as 40-bit long and 64-bit double word quantities, are stored in register pairs, with the 32 LSBs of data placed in an even-numbered register and the remaining 8 or 32 MSBs in the next upper register (which is always an odd-numbered register). Packed data types store either four 8-bit values or two 16-bit values in a single 32-bit register.

There are 32 valid register pairs for 40-bit and 64-bit data, as shown in Table 1. In assembly language syntax, a colon between the register names denotes the register pairs and the odd numbered register is encoded in the instruction opcode.

TABLE 1

40-Bit/64-Bit Register Pairs

| Register Files | |
| --- | --- |
| A | B |
| A1:A0 | B1:B0 |
| A3:A2 | B3:B2 |
| A5:A4 | B5:B4 |
| A7:A6 | 67:B6 |
| A9:A8 | B9:B8 |
| A11:A10 | B11:B10 |
| A13:A12 | B13:B12 |
| A15:A14 | B15:B14 |
| A17:A16 | B17:B16 |
| A19:A18 | B19:B18 |
| A21:A20 | B21:B20 |
| A23:A22 | B23:B22 |
| A25:A24 | B25:B24 |
| A27:A26 | B27:B26 |
| A29:A28 | B29:B28 |
| A31:A30 | B31:B30 |

For 40-bit data, operations requiring a long input ignore the 24 MSBs of the odd register. Operations producing a long result zero-fill the 24 MSBs of the odd register. The even register is encoded in the opcode.

The eight functional units in processor 10's data paths are be divided into two groups of four; each functional unit in one data path is almost identical to the corresponding unit in the other data path. The functional units are described in Table 2.

Besides being able to perform 32-bit data manipulations, processor 10 also contains many 8-bit and 16-bit data instructions in the instruction set. For example, the MPYU4 instruction performs four 8×8 unsigned multiplies with a single instruction on a .M unit. The ADD4 instruction performs four 8-bit additions with a single instruction on a .L unit.

TABLE 2

Functional Units and Operations Performed

| Functional Unit | Fixed-Point Operations |
| --- | --- |
| .L unit (.L1, .L2) | 32/40-bit arithmetic and compare operations |
| | 32-bit logical operations |
| | Leftmost 1 or 0 counting for 32 bits |
| | Normalization count for 32 and 40 bits |
| | Byte shifts |
| | Data packing/unpacking |
| | 5-bit constant generation |
| | Paired 16-bit arithmetic operations |
| | Quad 8-bit arithmetic operations |
| | Paired 16-bit min/max operations |
| | Quad 8-bit min/max operations |
| .S unit (.S1, .S2) | 32-bit arithmetic operations |
| | 32/40-bit shifts and 32-bit bit-field operations |
| | 32-bit logical operations |
| | Branches |
| | Constant generation |
| | Register transfers to/from control register file (.S2 only) |
| | Byte shifts |
| | Data packing/unpacking |
| | Paired 16-bit compare operations |
| | Quad 8-bit compare operations |
| | Paired 16-bit shift operations |
| | Paired 16-bit saturated arithmetic operations |
| | Quad 8-bit saturated arithmetic operations |
| .M unit (.M1, .M2) | 16 × 16 multiply operations |
| | 16 × 32 multiply operations |
| | Bit expansion |
| | Bit interleaving/de-interleaving |
| | Quad 8 × 8 multiply operations |
| | Paired 16 × 16 multiply operations |
| | Paired 16 × 16 multiply with add/subtract operations |
| | Quad 8 × 8 multiply with add operations |
| | Variable shift operations |
| | Rotation |
| | Galois Field Multiply |
| .D unit (.D1, .D2) | 32-bit add, subtract, linear and circular address calculation |
| | Loads and stores with 5-bit constant offset |
| | Loads and stores with 15-bit constant offset (.D2 only) |
| | Load and store double words with 5-bit constant |
| | Load and store non-aligned words and double words |
| | 5-bit constant generation |
| | 32-bit logical operations |

Most data lines in the CPU support 32-bit operands, and some support long (40-bit) and double word (64-bit) operands. Each functional unit has its own 32-bit write port into a general-purpose register file (Refer to FIG. 2). All units ending in 1 (for example, .L1) write to register file A 20a and all units ending in 2 write to register file B 20b. Each functional unit has two 32-bit read ports for source operands src1 and src2. Four units (.L1, .L2, .S1, and .S2) have an extra 8-bit-wide port for 40-bit long writes, as well as an 8-bit input for 40-bit long reads. Because each unit has its own 32-bit write port, when performing 32 bit operations all eight units can be used in parallel every cycle. Since each multiplier can return up to a 64-bit result, two write ports are provided from the multipliers to the register file.

Register File Cross Paths

Each functional unit reads directly from and writes directly to the register file within its own data path. That is, the .L1, .S1, .D1, and .M1 units write to register file A 20a and the .L2, .S2, .D2, and .M2 units write to register file B 20b. The register files are connected to the opposite-side register file's functional units via the 1X and 2X cross paths.

These cross paths allow functional units from one data path to access a 32-bit operand from the opposite side's register file. The 1X cross path allows data path A's functional units to read their source from register file B 20b. Similarly, the 2X cross path allows data path B's functional units to read their source from register file A 20a.

All eight of the functional units have access to the opposite side's register file via a cross path. The .M1, .M2, .S1, .S2, .D1 and .D2 unit' src2 inputs are selectable between the cross path and the same side register file. In the case of the .L1 and .L2 both src1 and src2 inputs are also selectable between the cross path and the same-side register file.

Only two cross paths, 1X and 2X, exist in this embodiment of the architecture. Thus the limit is one source read from each data path's opposite register file per cycle, or a total of two cross-path source reads per cycle. Advantageously, multiple units on a side may read the same cross-path source simultaneously. Thus the cross path operand for one side may be used by any one, multiple or all the functional units on that side in an execute packet. In the C62x/C67x, only one functional unit per data path, per execute packet could get an operand from the opposite register file.

A delay clock cycle is introduced whenever an instruction attempts to read a register via a cross path that was updated in the previous cycle. This is known as a cross path stall. This stall is inserted automatically by the hardware; no NOP instruction is needed. It should be noted that no stall is introduced if the register being read is the destination for data loaded by a LDx instruction.

Memory, Load and Store Paths

Processor 10 supports double word loads and stores. There are four 32-bit paths for loading data for memory to the register file. For side A, LD1a is the load path for the 32 LSBs; LD1b is the load path for the 32 MSBs. For side B, LD2a is the load path for the 32 LSBs; LD2b is the load path for the 32 MSBs. There are also four 32-bit paths, for storing register values to a memory from each register file. ST1a is the write path for the 32 LSBs on side A; ST1b is the write path for the 32 MSBs for side A. For side B, ST2a is the write path for the 32 LSBs; ST2b is the write path for the 32 MSBs.

Some of the ports for long and double word operands are shared between functional units. This places a constraint on which long or double word operations can be scheduled on a datapath in the same execute packet.

Data Address Paths

Bus 40a has an address bus DA1 which is driven by mux 200a. This allows an address generated by either load/store unit D1 or D2 to provide a memory address for loads or stores for register file 20a. Data Bus LD1 loads data from an address in memory 22 specified by address bus DA1 to a register in load unit D1. Unit D1 may manipulate the data provided prior to storing it in register file 20a. Likewise, data bus ST1 stores data from register file 20a to memory 22. Load/store unit D1 performs the following operations: 32-bit add, subtract, linear and circular address calculations. Load/store unit D2 operates similarly to unit D1, with the assistance of mux 200b for selecting an address.

The DA1 and DA2 resources and their associated data paths are specified as T1 and T2 respectively. T1 consists of the DA1 address path and the LD1a, LD1b, ST1a and ST1b data paths. Similarly, T2 consists of the DA2 address path and the LD2a, LD2b, ST2a and ST2b data paths. The T1 and T2 designations appear in functional unit fields for load and store instructions.

For example, the following load instruction uses the .D1 unit to generate the address but is using the LD2a path resource from DA2 to place the data in the B register file. The use of the DA2 resource is indicated with the T2 designation, for example: LDW .D1T2 *A0[3], B1.

Table 3 defines the mapping between instructions and functional units for a set of basic instructions included in a DSP described in U.S. Pat. No. 6,182,813 (incorporated herein by reference). Table 4 defines a mapping between instructions and functional units for a set of extended instructions in an embodiment of the present invention. Alternative embodiments of the present invention may have different sets of instructions and functional unit mapping. Table 3 and Table 4 are illustrative and are not exhaustive or intended to limit various embodiments of the present invention.

TABLE 3

Instruction to Functional Unit Mapping of Basic Instructions

| .L Unit | .M Unit | .S Unit | .D Unit |
|---------|---------|---------|---------|
| ABS     | MPY     | ADD     | ADD     |
| ADD     | SMPY    | ADDK    | ADDA    |
| AND     |         | ADD2    | LD mem  |
| CMPEQ   |         | AND     | LD mem (15-bit offset) (D2 only) |
| CMPGT   |         | B disp  | MV      |
| CMPGTU  |         | B IRP   | NEG     |
| CMPLT   |         | B NRP   | ST mem  |
| CMPLTU  |         | B reg   | ST mem (15-bit offset) (D2 only) |
| LMBD    |         | CLR     | SUB     |
| MV      |         | EXT     | SUBA    |
| NEG     |         | EXTU    | ZERO    |
| NORM    |         | MVC     |         |
| NOT     |         | MV      |         |
| OR      |         | MVK     |         |
| SADD    |         | MVKH    |         |
| SAT     |         | NEG     |         |
| SSUB    |         | NOT     |         |
| SUB     |         | OR      |         |
| SUBC    |         | SET     |         |
| XOR     |         | SHL     |         |
| ZERO    |         | SHR     |         |
|         |         | SHRU    |         |
|         |         | SSHL    |         |
|         |         | STP (S2 only) | |
|         |         | SUB     |         |
|         |         | SUB2    |         |
|         |         | XOR     |         |
|         |         | ZERO    |         |

TABLE 4

Instruction to Functional Unit Mapping of Extended Instructions

| .L unit | .M unit | .S unit | .D unit |
|---------|---------|---------|---------|
| ABS2    | AVG2    | ADD2    | ADD2    |
| ADD2    | AVGU4   | ADDKPC  | AND     |
| ADD4    | BITC4   | AND     | ANDN    |
| AND     | BITR    | ANDN    | LDDW    |
| ANDN    | DEAL    | BDEC    | LDNDW   |
| MAX2    | DOTP2   | BNOP    | LDNW    |
| MAXU4   | DOTPN2  | BPOS    | MVK     |
| MIN2    | DOTPNRSU2 | CMPEQ2 | OR     |
| MINU4   | DOTPNRUS2 | CMPEQ4 | STDW   |
|         | DOTPRSU2 | CMPGT2 |         |
|         | DOTPRUS2 | CMPGTU4 |        |
| MVK     | DOTPSU4 | CMPLT2  | STNDW   |
|         | DOTPUS4 |         |         |
| OR      | DOTPU4  | CMPLTU4 | STNW    |
| PACK2   | GMPY4   | MVK     | SUB2    |
| PACKH2  | MPY2    | OR      | XOR     |
| PACKH4  | MPYHI   | PACK2   |         |
| PACKHL2 | MPYHIR  | PACKH2  |         |
|         | MPYIH   |         |         |
|         | MPYIHR  |         |         |

TABLE 4-continued

Instruction to Functional Unit Mapping of Extended Instructions

| .L unit | .M unit | .S unit | .D unit |
|---|---|---|---|
| PACKL4 | MPYIL | PACKHL2 | |
| | MPYILR | | |
| | MPYLI | | |
| PACKLH2 | MPYLIR | PACKLH2 | |
| SHLMB | MPYSU4 | SADD2 | |
| | MPYUS4 | | |
| SHRMB | MPYU4 | SADDU4 | |
| SUB2 | MVD | SADDSU2 | |
| | | SADDUS2 | |
| SUB4 | ROTL | SHLMB | |
| SUBABS4 | SHFL | SHR2 | |
| SWAP2 | SMPY2 | SHRMB | |
| SWAP4 | SSHVL | SHRU2 | |
| UNPKHU4 | SSHVR | SPACK2 | |
| UNPKLU4 | XPND2 | SPACKU4 | |
| XOR | XPND4 | SUB2 | |
| | | SWAP2 | |
| | | UNPKHU4 | |
| | | UNPKLU4 | |
| | | XOR | |

The DSP's opcode map is shown in FIGS. 3A–3J. Refer to the instruction descriptions later herein for explanations of the field syntax and values. An instruction syntax is used to describe each instruction. The opcode map breaks down the various bit fields that make up each instruction. There are certain instructions that can be executed on more than one functional unit, as was shown in Table 4. The syntax specifies the functional unit and various resources used by an instruction, typically as follows:

EXAMPLE (.unit) src, dst

The following are examples of what the syntax looks like for the ADD instruction:

1) ADD (.unit) src1, src2, dst
2) ADDU (.unit) src1, src2, dst
3) ADD (.unit) src2, src1, dst
   unit=L1, .L2, .S1, .S2, .D1, .D2 src and dst indicate source and destination registers respectively. The (.unit) dictates which functional unit the instruction is mapped to (.L1, .L2, .S1, .S2, .M1, .M2, .D1, or .D2). This instruction has three opcode map fields: src1, src2, and dst.

The addressing modes for instructions that access memory are linear, circular using BK0, and circular using BK1. The mode is specified by an addressing mode register (AMR) contained in control register file 102. Eight registers can perform circular addressing. A4–A7 are used by the .D1 unit and B4–B7 are used by the .D2 unit. No other units can perform circular addressing modes. For each of these registers, the AMR specifies the addressing mode.

All instructions can be conditional. The condition is controlled by a 3-bit (creg) field specifying a register to be tested, and a 1-bit field (z) specifying a test for zero or nonzero, as shown in FIGS. 3A–3J. The four MSBs of every opcode are creg and z. The specified register is tested at the beginning of the E1 instruction execution pipeline stage for all instructions. The pipeline is described later herein. If z=1, the test is for equality with zero. If z=0, the test is for nonzero. The case of condition register field (creg)=0 and z=0 is treated as always true to allow instructions to be executed unconditionally. The creg register field is encoded as shown in Table 5. Conditional instructions are represented by "[ ]" surrounding the condition register.

TABLE 5

Registers That Can Be Tested by Conditional Operations

| Creg | | | z | Register Tested |
|---|---|---|---|---|
| 31 | 30 | 29 | 28 | |
| 0 | 0 | 0 | 0 | Unconditional. |
| 0 | 0 | 0 | 1 | Reserved: When selected this indicates a SWBP instruction |
| 0 | 0 | 1 | z | B0 |
| 0 | 1 | 0 | z | B1 |
| 0 | 1 | 1 | z | B2 |
| 1 | 0 | 0 | z | |
| 1 | 0 | 0 | z | A1 |
| 1 | 0 | 1 | z | A2 |
| 1 | 1 | x | x | Reserved |

Note:
x is don't care for reserved cases.

Instructions are always fetched eight at a time. This constitutes a fetch packet. The execution grouping of the fetch packet is specified by the p-bit, bit zero, of each instruction. Fetch packets are 8-word aligned.

The p bit controls the parallel execution of instructions. The p bits are scanned from left to right (lower to higher address). If the p bit of instruction i is 1, then instruction i+1 is to be executed in parallel with (in the same cycle as) instruction i. If the p-bit of instruction i is 0, then instruction i+1 is executed in the cycle after instruction i. All instructions executing in parallel constitute an execute packet. An execute packet can contain up to eight instructions. All instructions in an execute packet must use a unique functional unit.

Pipeline Operation

The DSP pipeline has several key features which improve performance, decrease cost, and simplify programming. They are: increased pipelining eliminates traditional architectural bottlenecks in program fetch, data access, and multiply operations; control of the pipeline is simplified by eliminating pipeline interlocks; the pipeline can dispatch eight parallel instructions every cycle; parallel instructions proceed simultaneously through the same pipeline phases; sequential instructions proceed with the same relative pipeline phase difference; and load and store addresses appear on the CPU boundary during the same pipeline phase, eliminating read-after-write memory conflicts.

A multi-stage memory pipeline is present for both data accesses and program fetches. This allows use of high-speed synchronous memories both on-chip and off-chip, and allows infinitely nestable zero-overhead looping with branches in parallel with other instructions.

There are no internal interlocks in the execution cycles of the pipeline, so a new execute packet enters execution every CPU cycle. Therefore, the number of CPU cycles for a particular algorithm with particular input data is fixed. If during program execution, there are no memory stalls, the number of CPU cycles equals the number of clock cycles for a program to execute.

Performance can be inhibited by stalls from the memory system, stalls for cross path dependencies, or interrupts. The reasons for memory stalls are determined by the memory architecture. Cross path stalls are described in detail in U.S. patent application Ser. No. 09/702,453 filed Oct. 31, 2000 entitled Microprocessor with Conditional Cross Path Stall which is incorporated herein by reference. To fully understand how to optimize a program for speed, the sequence of program fetch, data store, and data load requests the program makes, and how they might stall the CPU should be understood.

Figure 4:
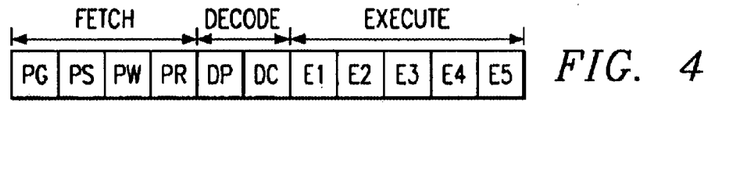
FIG. 4 is a timing diagram illustrating instruction execution pipeline phase of the processor of FIG. 1.

The pipeline operation, from a functional point of view, is based on CPU cycles. A CPU cycle is the period during which a particular execute packet is in a particular pipeline stage. CPU cycle boundaries always occur at clock cycle boundaries; however, stalls can cause CPU cycles to extend over multiple clock cycles. To understand the machine state at CPU cycle boundaries, one must be concerned only with the execution phases (E1–E5) of the pipeline. The phases of the pipeline are shown in FIG. 4 and described in Table 6.

TABLE 6

Pipeline Phase Description

| Pipeline | Pipeline Phase | Symbol | During This Phase | Instruction Types Completed |
|---|---|---|---|---|
| Program Fetch | Program Address Generate | PG | Address of the fetch packet is determined. | |
| | Program Address Send | PS | Address of fetch packet is sent to memory. | |
| | Program Wait | PW | Program memory access is performed. | |
| | Program Data Receive | PR | Fetch packet is expected at CPU boundary. | |
| Program Decode | Dispatch | DP | Next execute packet in fetch packet determined and sent to the appropriate functional units to be decoded. | |
| | Decode | DC | Instructions are decoded at functional units. | |
| Execute | Execute 1 | E1 | For all instruction types, conditions for instructions are evaluated and operands read. Load and store instructions: address generation is computed and address modifications written to register file† Branch instructions: affects branch fetch packet in PG phase† Single-cycle instructions: results are written to a register file† | Single-cycle |
| | Execute 2 | E2 | Load instructions: address is sent to memory† Store instructions and STP: address and data are sent to memory† Single-cycle instructions that saturate results set the SAT bit in the Control Status Register (CSR) if saturation occurs.† Multiply instructions: results are written to a register file† | Stores STP Multiplies |
| | Execute 3 | E3 | Data memory accesses are performed. Any multiply instruction that saturates results sets the SAT bit in the Control Status Register (CSR) if saturation occurs.† | |
| | Execute 4 | E4 | Load instructions: data is brought to CPU boundary† | |
| | Execute 5 | E5 | Load instructions: data is loaded into register† | Loads |

†This assumes that the conditions for the instructions are evaluated as true. If the condition is evaluated as false, the instruction will not write any results or have any pipeline operation after E1.

Referring again to FIG. 4 and FIG. 1, the instruction execution pipeline of processor 10 involves a number of discrete stages, generally demarcated by temporary latches or registers to pass the results of one stage to the next. Instruction pipeline phases PG, PS, PW, and PR all involve instruction fetching and are embodied in program fetch circuit 10 in association with program memory subsystem 23. Pipeline phases DP and DC involve instruction decoding; phase DP is embodied in dispatch circuitry 10b, while pipeline phase DC is embodied in decode circuitry 10c. The execution phases E1–E5 are embodied in stages embodied within each functional unit L, S, M and D. For example, the D units embody all five execute stage in association with memory subsystem 22. Other of the functional units do not embody all five execution phase, but only what is required for the instruction types that are executed by a particular functional unit.

The execution of instructions can be defined in terms of delay slots, as shown in Table 7. A delay slot is a CPU cycle that occurs after the first execution phase (E1) of an instruction in which results from the instruction are not available. For example, a multiply instruction has 1 delay slot, this means that there is 1 CPU cycle before another instruction can use the results from the multiply instruction.

TABLE 7

Delay Slot Summary

| Instruction Type | Delay Slots | Execute Stages Used |
|---|---|---|
| Branch (The cycle when the target enters E1) | 5 | E1-branch target E1 |
| Load (LD) (Incoming Data) | 4 | E1–E5 |
| Load (LD) (Address Modification) | 0 | E1 |
| Multiply | 1 | E1–E2 |
| Single-cycle | 0 | E1 |
| Store | 0 | E1 |
| NOP (no execution pipeline operation) | — | — |
| STP (no CPU internal results written) | — | — |

Single cycle instructions execute during the E1 phase of the pipeline. The operand is read, operation is performed and the results are written to a register all during E1. These instructions have no delay slots.

Multiply instructions complete their operations during the E2 phase of the pipeline. In the E1 phase, the operand is read and the multiply begins. In the E2 phase, the multiply finishes, and the result is written to the destination (dst) register. Multiply instructions have 1 delay slot.

Load instructions have two results: data loaded from memory and address pointer modification.

Data loads complete their operations during the E5 phase of the pipeline. In the E1 phase, the address of the data is computed. In the E2 phase, the data address is sent to data memory. In the E3 phase, a memory read is performed. In the E4 stage, the data is received at the CPU core boundary. Finally, in the E5 phase, the data is loaded into a register. Because data is not written to the register until E5, these instructions have 4 delay slots. Because pointer results are written to the register in E1, there are no delay slots associated with the address modification.

Store instructions complete their operations during the E3 phase of the pipeline. In the E1 phase, the address of the data is computed. In the E2 phase, the data address is sent to data memory. In the E3 phase, a memory write is performed. The address modification is performed in the E1 stage of the pipeline. Even though stores finish their execution in the E3 phase of the pipeline, they have no delay slots and follow the following rules (i=cycle):

1) When a load is executed before a store, the old value is loaded and the new value is stored.
2) When a store is executed before a load, the new value is stored and the new value is loaded.
3) When the instructions are in are in parallel, the old value is loaded and the new value is stored.

De-Interleave and Pack (DEAL) and Shuffle (SHFL) Instructions

An aspect of the present invention is that the DSP of FIG. 1 includes a pair of bit swizzling instructions that interleave and de-interleave bits of an operand. By so doing, performance of the processor is improved. One such instruction is a Shuffle (SHFL) instruction. Another instruction included in the present embodiment is a De-interleave and Pack (DEAL) instruction.

Figures 5, 9:
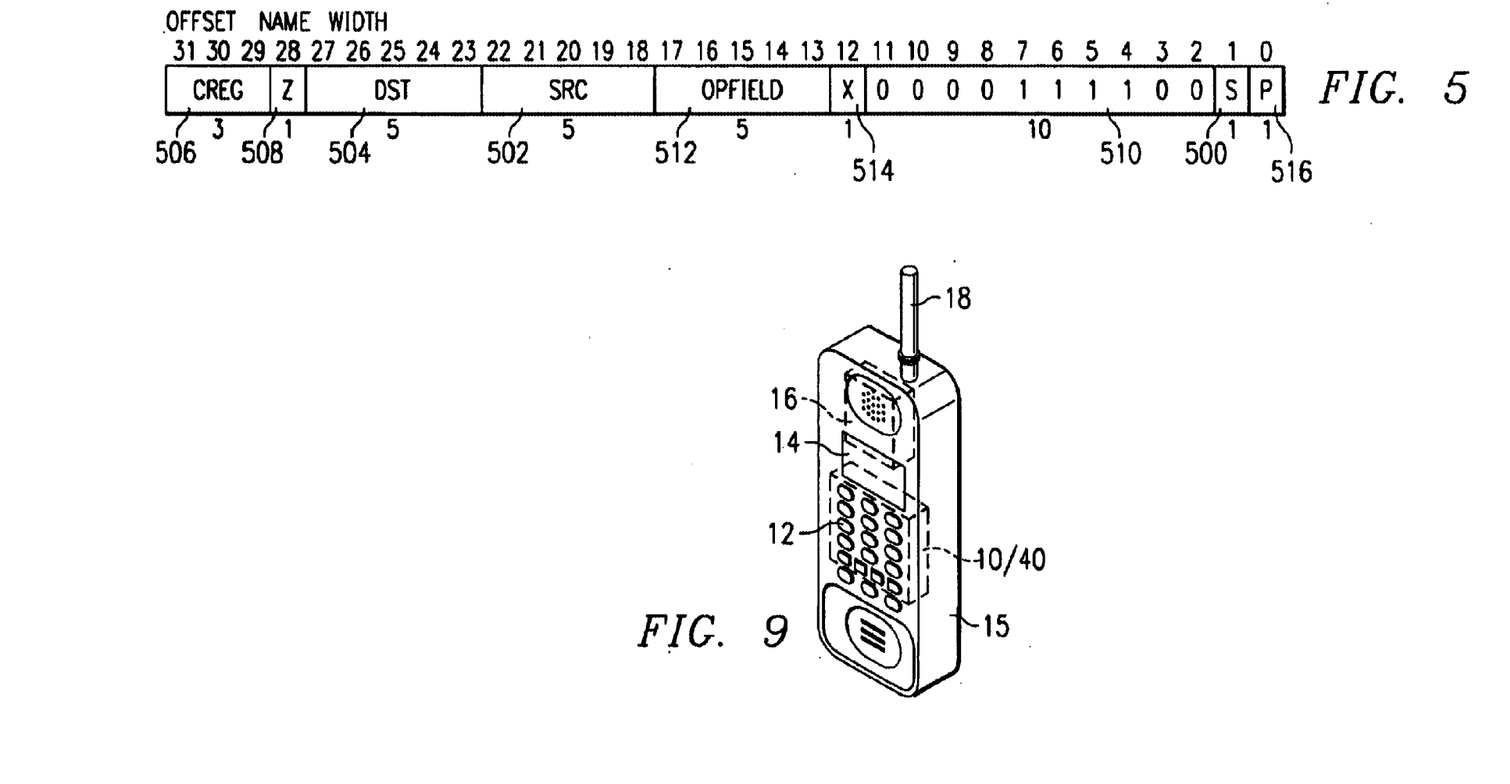
FIG. 5 illustrates an instruction syntax for a shuffle (SHFL) and a De-interleave and Pack (DEAL) instruction.
FIG. 9 illustrates an exemplary implementation of a digital system that includes an embodiment of the present invention in a mobile telecommunications device.

FIG. 5 illustrates an instruction syntax for a DEAL instruction. This same syntax is used for the SHFL instruction. In this embodiment, the DEAL and SHFL instruction can be executed in either .M functional unit 14a or 14b as indicated by unit select bit field 500. The instruction includes a source operand field (src) 502 selects a register from associated register file 20a or 20b to access a source operand which is a 32-bit data value. The DEAL/SHFL instructions each perform a bit swizzling operation on the contents of the selected source operand. The swizzled result is written to a destination register specified by a destination field (dst) 504.

Referring still to FIG. 5, field 510 defines a class of instruction formats, while opcode field 512 specifies that a particular instruction of this class is a DEAL or SHFL instruction. Crossover control field 514 specifies which register file 20a or 20b will be accessed for a source operand, as discussed previously. Parallel bit 516 indicates if this instruction is to be executed in parallel with an adjacent instruction in a fetch packet, as discussed previously.

As with all of the instructions executed by the DSP of FIG. 1, the DEAL/SHFL instructions are conditional based on a predicate register selected by condition register field (creg) 506 and zero indicator bit 508, as discussed previously.

Table 8 defines the operation of the DEAL instruction, while Table 9 defines the operation of the SHFL instruction using pseudo code. Just as with other conditionally executed instructions, if the predicate condition tests false, DEAL or SHFL instruction does not complete execution and the write of the dst register is inhibited.

TABLE 8

Execution of DEAL Instruction

```
if(cond) {
    src2 31, 29, 27 ... 1 → dst 31, 30, 29 ... 16;
    src2 30, 28, 26 ... 0 → dst 15, 14, 13 ... 0;
}
else nop
```

TABLE 9

Execution of SHFL Instruction

```
if(cond) {
    src2 31, 30, 29 ... 16 → dst 31, 29, 27 ... 1
    src2 15, 14, 13 ... 0 → dst 30, 28, 26 ... 0
}
else nop
```

Figure 6A:
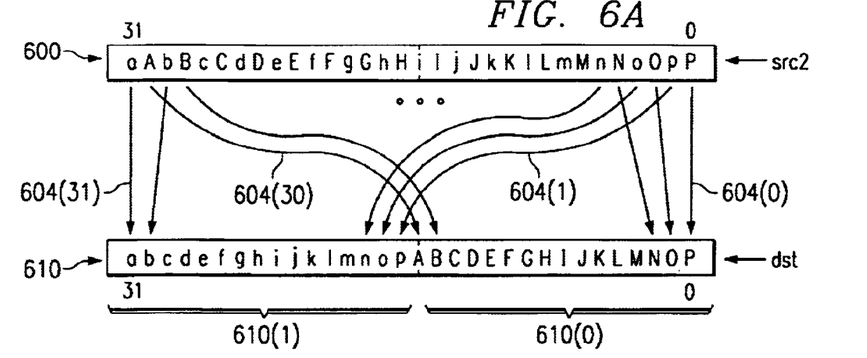
FIG. 6A is a flow chart illustrating operation of an DEAL instruction.

FIG. 6A is a flow chart illustrating operation of a DEAL instruction. The DEAL instruction performs a de-interleave and pack operation on the bits in source operand (src2) 600. The odd and even bits of src2 are extracted into two separate 16-bit quantities. These 16-bit quantities are then packed such that the even bits are placed in an lower half-word 610(0) of destination operand (dst) 610, and the odd bits are placed in an upper half word 610(1) of the destination operand. For example, even bit 0 of source operand 600 is placed in a least significant bit (lsb) position of half-word 610(0) as indicated by arc 604(0). Likewise, odd bit 1 of source operand 600 is placed in an lsb position in half-word 610(1) as indicated by arc 604(1).

As a result, bits 0, 2, 4, . . . , 28, 30 of src2 are placed in bits 0, 1, 2, . . . , 14, 15 of dst. Likewise, bits 1, 3, 5, . . . , 29, 31 of src2 are placed in bits 16, 17, 18, . . . , 30, 31 of dst.

For example, for the following instruction: DEAL .M A0,A1; if a source operand in register A0 contained a value of 0x5555 5555, then at the completion of execution, register A1 (the selected destination register) will contain a value of 0x0000 FFFF, which is the result of de-interleaving the odd/even bits into two sets and packing the two sets into a single destination operand. In this embodiment, the destination is written during pipeline phase E2 and the DEAL instruction is categorized has having one delay slot.

For another example, for the following instruction: DEAL .M A0,A1: if a source operand in register A0 contained a value of 0xAAAA AAAA, then at the completion of execution, register A1 (the selected destination register) will contain a value of 0xFFFF 0000.

Figure 6B:
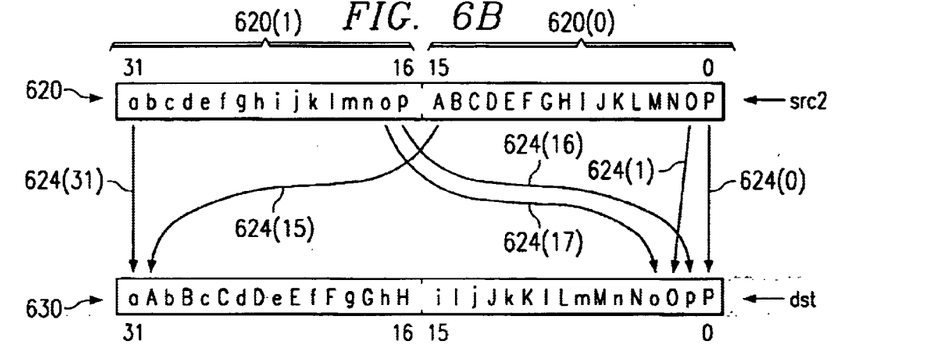
FIG. 6B is a flow chart illustrating operation of an SHFL instruction.

FIG. 6B is a flow chart illustrating operation of an SHFL instruction. The SHFL instruction performs an interleave operation on the two half-words 620(0), 620(1) in source operand (src2) 620. The bits in the lower half-word 620(0) of src2 are placed in the even bit positions in destination register (dst) 630, and the bits in the upper half-word 620(1) of src2 are placed in the odd bit positions in dst, as indicated by arcs 624(0)–624(31). In this embodiment, the destination is written during pipeline phase E2 and the SHFL instruction is categorized has having one delay slot.

As a result, bits 0, 1, 2, . . . , 14, 15 of src2 are placed in bits 0, 2, 4, . . . , 28, 30 of dst. Likewise, bits 16, 17, 18, . . . 30, 31 of src2 are placed in bits 1, 3, 5, . . . 29, 31 of dst.

For another example, for the following instruction: SHFL .M A0,A2: if a source operand in register AO contained a value of 0xAAAA 9999, then at the completion of execution, register A2 (the selected destination register) will contain a value of 0XC9C9 C9C9. Likewise, if A0 contains a value of 0xFFFF 0000, then register A2 will be written with a value of 0xAAAA AAAA at the completion of execution.

The SHFL instruction is the exact inverse of the DEAL instruction. Furthermore, by comparing FIGS. 6A and 6B, it can be seen that if a SHFL instruction is executed on a source operand 600 to form a destination operand 610, and then a DEAL instruction is executed using destination operand 610 as a source operand, then the result formed as destination operand 630 will be identical to the original value from source operand 600. Likewise, a DEAL-SHFL sequence will return the original operand value.

Figure 7:
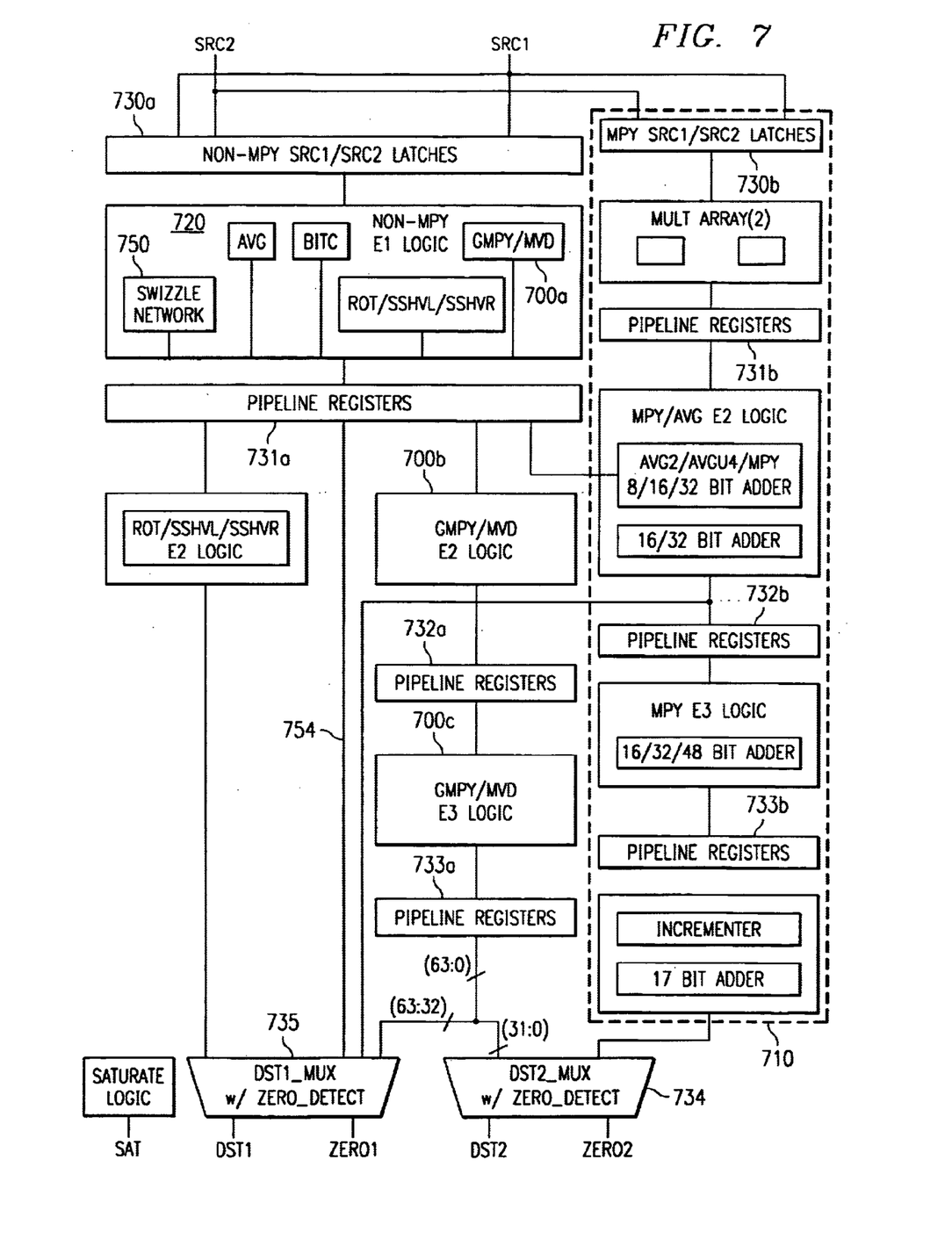
FIG. 7 is a block diagram illustrating swizzle circuitry for performing SHFL and DEAL instructions within an .M functional unit.

FIG. 7 is a top level block diagram of .M unit 14a, which is optimized to handle multiplication, although hardware is available for a limited set of add and subtract operations and also for the bit-swizzling instructions of the present invention. The .M unit has three major functional units: Galois multiply unit 700a–c, multiply unit 710 and other non-multiply functional circuitry in block 720. Galois multiplier 700a–c and multiplier 710 require three additional cycles to complete the multiply operations, so multiply instructions are categorized as having three delay slots. Pipeline registers 730–733 hold partial results between each pipeline execution phase. In general, multiply unit 710 can perform the following operations: two 16×16 multiplies or four 8×8 multiplies with all combination of signed or unsigned numbers, Q-shifting and P-shifting of multiply results, rounding for multiply instructions, controlling the carry chain by breaking/joining the carry chain at 16-bit block boundaries, and saturation multiplication where the final result is shifted left by 1 or returns 0x7FFFFFFF if an overflow occurs. Galois multiply unit 700 performs Galois multiply in parallel with M multiply unit 710. The lower 32 bits (bits 31:0) of a result are selected by multiplexer 734 and are stored in the even register of a register pair. The upper 32 bits (bits 63:33) of the result are selected by multiplexer 735 and are stored in the odd register of the register pair. A more detailed description of configurable multiply circuitry is provided in co-assigned U.S. patent application Ser. No. 09/703,093 filed Oct. 31, 2000 entitled "Data Processor With Flexible Multiply Unit" and is incorporated herein by reference.

Swizzle circuitry 750 is located within non-multiplier circuitry 720 in this embodiment. During execution of a DEAL or SHFL instruction, operands are provided to swizzle circuitry 750 from pipeline source latch 730a. A swizzle operation is performed in execution phase and the swizzled results stored in pipeline register 731a. Output path 754 allows a swizzled result to be written to a destination register specified by the instruction syntax.

Thus, the swizzle circuit forms a swizzled result value from a value in a source operand that is then written into a selected destination register during instruction pipeline phase E2 in response to a single DEAL or SHFL instruction. Pipeline register 731a, FIG. 7, holds the source operands during an E1 to E2 phase transition.

Figure 6C:
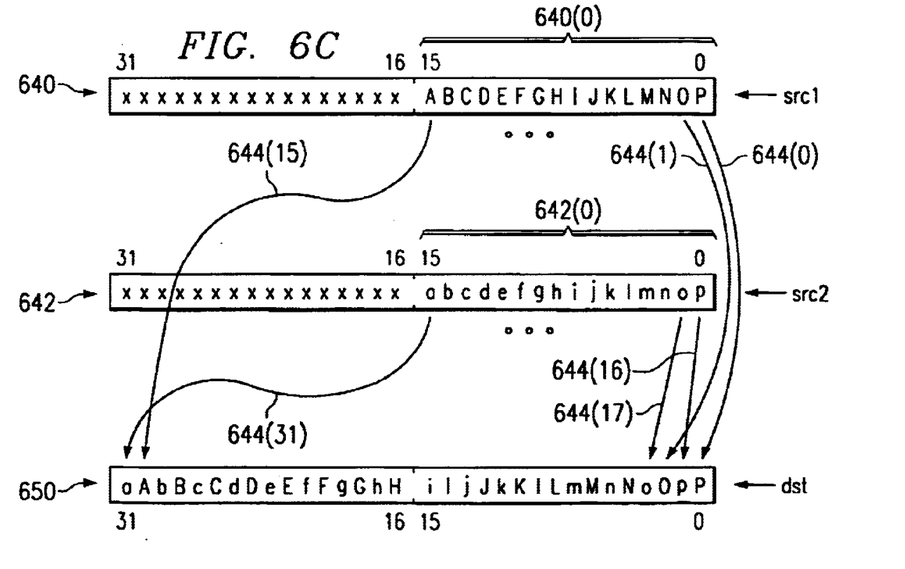
FIG. 6C is a flow chart illustrating another embodiment of a SHFL instruction.

Swizzle circuitry 750 is implemented using multiplexors to select the appropriate bits from source operands src1 and src2, according to FIGS. 6A–6C. One skilled in the art will recognize that swizzle circuitry 750 may be implemented in a number of different ways, by using various configurations of multiplexers, barrel shifters, and such. In another embodiment, the swizzle circuitry may be implemented such that a swizzle instruction executes with a different number of delay slots, such as none or two, for example. In another embodiment, an operand field having a different width may be swizzled, such as 64, for example. There may be other than two varieties of signed swizzle instructions wherein different opcodes or a parameter is used to identify various bit operations. In this embodiment of the present invention, swizzle circuitry is included in the M units of the CPU. However, in another embodiment, swizzle circuitry may be included in other or different functional units.

In another embodiment, swizzle circuitry may be separate and not associated with multiply circuitry, for example.

FIG. 6C is a flow chart illustrating another embodiment of a SHFL instruction. In this embodiment, swizzle circuitry is connected to receive two source operands 640 and 642. The SHFL instruction performs an interleave operation on a lower half-word 640(0) in source operand (src1) 640 and on a lower half-word 642(0) in source operand (src2) 642. The bits in the lower half-word 640(0) of src1 are placed in the even bit positions in destination register (dst) 650, and the bits in the lower half-word 642(0) of src2 are placed in the odd bit positions in dst, as indicated by arcs 644(0)–644(31).

In another embodiment, shuffle instructions represented by both FIGS. 6B and 6C are included. Different opcodes may be used, or a bit in a control register may be set to define operation on one source operand or on two source operands, for example. Likewise, a DEAL instruction may provide a de-interleaved result to two destination operands, such as even-odd register pair in which extracted 16-bit quantities are placed in the low-half word of each destination register, for example.

Figure 8:
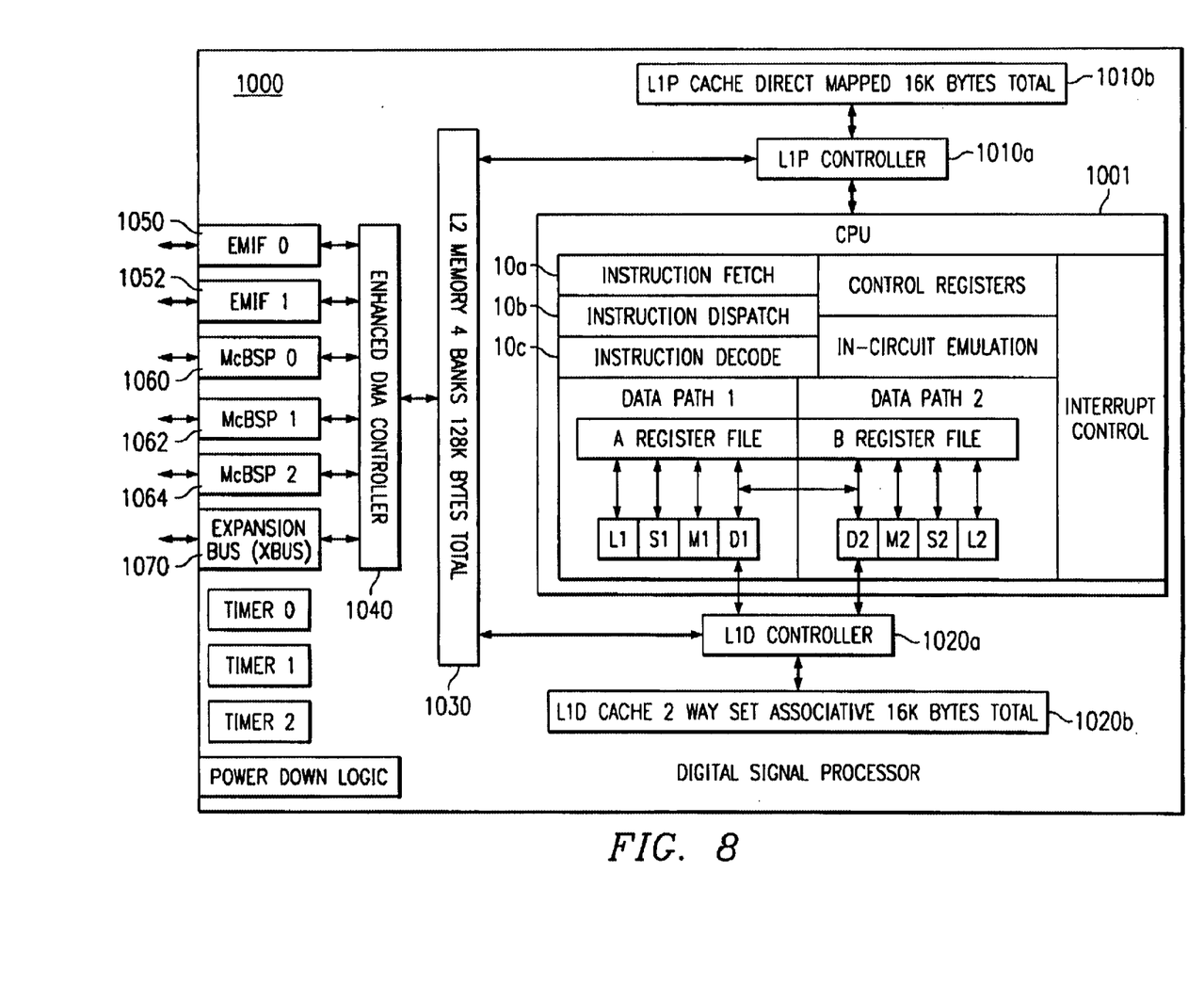
FIG. 8 is a block diagram of an alternative embodiment of the processor of FIG. 1.

FIG. 8 is a block diagram of an alternative embodiment of the present invention in a digital system 1000 with processor core 10 of FIG. 1. A direct mapped program cache 1010, having 16 Kbytes capacity, is controlled by L1 Program (L1P) controller 1011 and connected thereby to the instruction fetch stage 10a. A 2-way set associative data cache, having a 16 Kbyte capacity, is controlled by L1 Data (L1D) controller 1721 and connected thereby to data units D1 and D2. An L2 memory 1030 having four banks of memory, 128 Kbytes total, is connected to L1P 1011 and to L1D 1021 to provide storage for data and programs. External memory interface (EMIF) 1050 provides a 64-bit data path to external memory, not shown, which provides memory data to L2 memory 1030 via extended direct memory access (DMA) controller 1040.

EMIF 1052 provides a 16-bit interface for access to external peripherals, not shown. Expansion bus 1070 provides host and I/O support similarly to host port 60/80 of FIG. 1.

Three multi-channel buffered serial ports (McBSP) 1060, 1062, 1064 are connected to DKA controller 1040. A detailed description of a McBSP is provided in U.S. Pat. No. 6,167,466 entitled Multi-Channel Serial Port with Programmable Features which is incorporated herein reference.

FIG. 9 illustrates an exemplary implementation of a digital system that includes DSP 1 packaged in an integrated circuit 40 in a mobile telecommunications device, such as a wireless telephone 15. Wireless telephone 15 has integrated keyboard 12 and display 14. As shown in FIG. 9, DSP 1 is connected to the keyboard 12, where appropriate via a keyboard adapter (not shown), to the display 14, where appropriate via a display adapter (not shown) and to radio frequency (RF) circuitry 16. The RF circuitry 16 is connected to an aerial 18. Advantageously, by providing a shuffle and deal instruction, complex signal processing algorithms can be written in a more efficient manner to satisfy the demand for enhanced wireless telephony functionality. Deal is useful for sorting out interleaved data. Shuffle is useful for merging multiple streams of data prior to transmission, to improve error correction coding (ECC) or for convolutional encoding, for example.

Fabrication of digital system 10 involves multiple steps of implanting various amounts of impurities into a semiconductor substrate and diffusing the impurities to selected depths within the substrate to form transistor devices. Masks are formed to control the placement of the impurities. Multiple layers of conductive material and insulative material are deposited and etched to interconnect the various devices. These steps are performed in a clean room environment.

A significant portion of the cost of producing the data processing device involves testing. While in wafer form, individual devices are biased to an operational state and probe tested for basic operational functionality. The wafer is then separated into individual dice which may be sold as bare die or packaged. After packaging, finished parts are biased into an operational state and tested for operational functionality.

Thus, a digital system is provided with a processor having an improved instruction set architecture. The processor is code-compatible with C62xx DSP processors from Texas Instruments Incorporated. It provides a superset of the C62x architecture while providing complete code compatibility for existing C62x code. The processor provides extensions to the existing C62x architecture in several areas: register file enhancements, data path extensions, additional functional unit hardware, increased orthogonality of the instruction set, data flow enhancements, 8-bit and 16-bit extensions, and additional instructions that reduce code size and increase register flexibility.

Advantageously, a pair of bit-swizzling instructions is provided that provide bit interleaving and complimentary de-interleaving. Code size is thereby reduced and performance improved.

As used herein, the terms "applied," "connected," and "connection" mean electrically connected, including where additional elements may be in the electrical connection path. "Associated" means a controlling relationship, such as a memory resource that is controlled by an associated port. The terms assert, assertion, de-assert, de-assertion, negate and negation are used to avoid confusion when dealing with a mixture of active high and active low signals. Assert and assertion are used to indicate that a signal is rendered active, or logically true. De-assert, de-assertion, negate, and negation are used to indicate that a signal is rendered inactive, or logically false.

While the invention has been described with reference to illustrative embodiments, this description is not intended to be construed in a limiting sense. Various other embodiments of the invention will be apparent to persons skilled in the art upon reference to this description. In another embodiment, the source operands may be provided in response to a memory fetch instead of being read from the register file. A DEAL or SHFL instruction may be executed in another functional unit instead of or in addition to the .M functional units. In another embodiment, a different operand size, such as 48 or 64 bits, for example, could be bit-swizzled.

It is therefore contemplated that the appended claims will cover any such modifications of the embodiments as fall within the true scope and spirit of the invention.

What is claimed is:

1. A digital system comprising a microprocessor having an instruction execution pipeline with a plurality of pipeline phases, wherein the microprocessor comprises:
    program fetch circuitry operable during a first portion of the plurality of pipeline phases to fetch instructions;
    instruction decode circuitry connected to receive fetched instructions from the program fetch circuitry, the instruction decode circuitry operable during a second portion of the plurality of pipeline phases to decode fetched instructions; and
    at least a first functional unit connected to receive control signals from the instruction decode circuitry, the functional unit operable to perform a third portion of the plurality of pipeline phases, the third portion being execution phases, wherein the first functional unit comprises:
        swizzle circuitry connected to receive a source operand and having destination operand outputs for providing a destination operand in response to control signals from the instruction decode circuitry, wherein the swizzle circuitry is operable to form a swizzled result on the destination operand outputs by interleaving individual bits from a first portion of the source operand with individual bits from a second portion of the source operand wherein each bit of the source operand occupies a position in the destination operand; and
    wherein the first functional unit is operable to provide the swizzled result in response to a single instruction of a first type.

2. The digital system of claim 1, wherein the swizzle circuitry is operable to receive the source operand and to provide a swizzled result on the destination operand during a single pipeline execution phase.

3. The digital system of claim 1, further comprising a register file connected to the first functional unit for providing the source operand and connected to the first functional unit to receive the destination operand.

4. The digital system of claim 1 being a cellular telephone, further comprising:
    an integrated keyboard connected to the CPU via a keyboard adapter;
    a display, connected to the CPU via a display adapter;
    radio frequency (RF) circuitry connected to the CPU; and
    an aerial connected to the RF circuitry.

5. A method of operating a digital system having a microprocessor with a shuffling instruction, comprising the steps of:
    fetching a first shuffling instruction for execution;
    fetching a first operand including a first source operand portion and a second source operand portion selected by the first shuffling instruction;
    swizzling the first source operand portion and the second source operand portion to form an interleaved result by interleaving individual bits from the first source operand portion with bits from the second source operand portion wherein each bit of the source operand occupies a position in the interleaved result; and
    writing a destination operand with the interleaved result.

6. The method of claim 5, wherein the step of swizzling is performed during a single execution phase of the microprocessor.

7. A method of operating a digital system having a microprocessor with a deal instruction, comprising the steps of:
    fetching a first deal instruction for execution;
    fetching a first source operand selected by the first deal instruction;
    de-interleaving the first source operand by extracting a first set of bits from the first source operand to form a first bit contiguous field and extracting a second set of bits from the first source operand to form a second bit contiguous field wherein each bit of the first source operand occupies a position in the de-interleaved result;
    packing the first bit contiguous field and the second bit contiguous field together to form a packed de-interleaved result; and
    writing a first destination operand with the packed de-interleaved result.

8. The method of claim 7, wherein the first set of bits is a set of odd bits from the first source operand and wherein the second set of bits is a set of even bits from the first source operand.

9. The method of claim 8, further comprising the steps of:
    fetching a first shuffling instruction for execution;
    fetching a second source operand portion and a third operand portion selected by the first shuffling instruction;
    interleaving the second source operand portion and the third source operand portion to form an interleaved result by interleaving bits from the second source operand portion with bits from the third operand portion; and writing a second destination operand with the interleaved result.

10. The method of claim 9, wherein the step of interleaving and the step of de-interleaving have an exactly inverse effect.

11. A microprocessor comprising:
a register file including a plurality of data registers;
program fetch circuitry operable to fetch microprocessor instructions;
instruction decode circuitry connected to receive fetched instructions from the program fetch circuitry, the instruction decode circuitry operable to decode fetched instructions; and
at least one functional unit connected to the register file and the instruction decode circuitry, the functional unit operable responsive to a shuffle instruction to
receive a source operand from an instruction designated source data register of the plurality of data registers,
interleave individual bits from a first portion of the source operand with individual bits from a second portion of the source operand forming a shuffled data word having a bit length equal to the data register, wherein each bit of the source operand occupies a position in the shuffled data word, and
store the shuffled data word into an instruction designated destination data register of the plurality of data registers.

12. The microprocessor of claim 11, wherein:
each of the plurality of data registers of the register file includes N bits;
the first portion of the source operand is N/2 most significant bits of the source operand; and
the second portion of the source operand is N/2 least significant bits of the source operand.

13. A microprocessor comprising:
a register file including a plurality of data registers;
program fetch circuitry operable to fetch microprocessor instructions;
instruction decode circuitry connected to receive fetched instructions from the program fetch circuitry, the instruction decode circuitry operable to decode fetched instructions; and
at least one functional unit connected to the register file and the instruction decode circuitry, the functional unit operable responsive to a first type shuffle instruction to
receive a source operand from an instruction designated source register of the plurality of data registers,
interleave individual bits from a first portion of the source operand with individual bits from a second portion of the source operand forming a shuffled data word having a bit length equal to the data register, wherein each bit of the source operand occupies a position in the shuffled data word, and
store the shuffled data word into an instruction designated destination data register of the plurality of data registers;
the functional unit operable to responsive to a second type shuffle instruction to
receive a first source operand from a first instruction designated source data register of the plurality of data registers,
receive a second source operand from a second instruction designated source data the plurality of data registers,
interleave individual bits from a first portion of the first source operand with individual bits from a second portion of the second source operand forming a shuffled data word having a bit length equal to a data register, wherein each bit of the first portion of the first source operand and the second portion of the second source operand occupies a position in the shuffled data word, and
store the shuffled data word into an instruction designated destination data register of the plurality of data registers.

14. The microprocessor of claim 13, wherein:
each of the plurality of data registers of the register file includes N bits;
the first portion of the source operand of the first type shuffle instruction is N/2 most significant bits of the source operand; and
the second portion of the source operand of the first type shuffle instruction is N/2 least significant bits of the source operand.

15. The microprocessor of claim 13, wherein:
each of the plurality of data registers of the register file includes N bits;
the first portion of the first source operand of the second type shuffle instruction is N/2 least significant bits of the first source operand; and
the second portion of the second source operand of the second type shuffle instruction is N/2 least significant bits of the second source operand.

16. A microprocessor comprising;
a register file including a plurality of data registers;
program fetch circuitry operable to fetch microprocessor instructions;
instruction decode circuitry connected to receive fetched instructions from the program fetch circuitry, the instruction decode circuitry operable to decode fetched instructions; and
at least one functional unit connected to the register file and the instruction decode circuitry, the functional unit operable responsive to a deal instruction to
receive a source operand from an instruction designated source data register of the plurality of data registers,
de-interleave bits from the source operand by extracting a first set of bits from the source operand to form a first bit contiguous field in a dealt data word and extracting a second set of bits from the source operand to form a second bit contiguous field in the dealt data word, and
store the dealt data word into an instruction designated destination data register of the plurality of data registers.

17. The microprocessor of claim 16, wherein:
each of the plurality of data registers of the register file includes N bits;
the first set of bits of the source operand is N/2 odd bits of the source operand;
the first bit contiguous field in the dealt data word is N/2 most significant bits of the dealt data word;
the second set of bits of the source operand is N/2 even bits of the source operand; and
the second bit contiguous field in the dealt data word is N/2 least significant bits of the dealt data word.

18. A microprocessor comprising:
a register file including a plurality of data registers;
program fetch circuitry operable to fetch microprocessor instructions;

instruction decode circuitry connected to receive fetched instructions from the program fetch circuitry, the instruction decode circuitry operable to decode fetched instructions; and at least one functional unit connected to the register file and the instruction decode circuitry, the functional unit operable responsive to a deal instruction to receive a source operand from an instruction designated source data register of the plurality of data registers, de-interleave bits from the source operand by extracting a first set of bits from the source operand to form a first bit contiguous field in a first dealt data word and extracting a second set of bits from the source operand to form a second bit contiguous field in a second dealt data word, store the first dealt data word into a first bit contiguous field of a first instruction designated destination data register of the plurality of data registers, and store the second dealt data word into a second bit contiguous field of a second instruction designated data register of the plurality of data registers.

19. The microprocessor of claim 18, wherein:

each of the plurality of data registers of the register file includes N bits;

the first set of bits of the source operand is N/2 odd bits of the source operand;

the first bit contiguous field in the first dealt data word is N/2 least significant bits of the first instruction designated destination register;

the second set of bits of the source operand is N/2 even bits of the source operand; and the second bit contiguous field in the second dealt data word is N/2 least significant bits of the second instruction designated destination register.

20. The microprocessor of claim 18, wherein:

the first instruction designated destination data register and the second instruction designated destination data register consist of an adjacent even-odd register pair.

21. A microprocessor comprising:

a register file including a plurality of data registers;

program fetch circuitry operable to fetch microprocessor instructions;

instruction decode circuitry connected to receive fetched instructions from the program fetch circuitry, the instruction decode circuitry operable to decode fetched instructions; and at least one functional unit connected to the register file and the instruction decode circuitry, the functional unit operable responsive to a first deal instruction to receive a source operand from an instruction designated source data register of the plurality of data registers, de-interleave bits from the source operand by extracting a first set of bits from the source operand to form a first bit contiguous field in a dealt data word and extracting a second set of bits from the source operand to form a second bit contiguous field in the dealt data word, store the dealt data word into an instruction designated destination register of the plurality of data registers;

the functional unit operable responsive to a second deal instruction to receive a source operand from an instruction designated source data register of the plurality of data registers;

de-interleave bits from the source operand by extracting a first set of bits from the source operand to form a first bit contiguous field in a first dealt data word and extracting a second set of bits from the source operand to form a second bit contiguous field in a second dealt data word, store the first dealt data word into a first bit contiguous field of a first instruction designated destination data register of the plurality of data registers, and store the second dealt data word into a second bit contiguous field of a second instruction designated destination data register of the plurality of data registers.

22. The microprocessor of claim 21, wherein:

each of the plurality of data registers of the register file includes N bits;

the first set of bits of the source operand is N/2 odd bits of the source operand;

the first bit contiguous field in the dealt data word of the first type deal instruction is N/2 even bits of the dealt data word;

the second set of bits of the source operand is N/2 even bits of the source operand; and the second bit contiguous field in the dealt data word of the first type deal instruction is N/2 least significant bits of the dealt data word.

23. The microprocessor of claim 21, wherein:

each of the plurality of data registers of the register file includes N bits;

the first set of bits of the source operand is N/2 odd bits of the source operand;

the first bit contiguous field in the first dealt data word is N/2 least significant bits of the first instruction designated destination register;

the second set of bits of the source operand is N/2 even bits of the source operand; and the second bit contiguous field in the second dealt data word is N/2 least significant bits of the second instruction designated destination register.

24. The microprocessor of claim 21, wherein:

the first instruction designated destination data register and the second instruction designated destination data register consist of an adjacent even-odd register pair.

* * * * *